US009648208B2

(12) United States Patent
Kostyukov et al.

(10) Patent No.: US 9,648,208 B2
(45) Date of Patent: *May 9, 2017

(54) METHOD AND APPARATUS AND USING AN ENLARGEMENT OPERATION TO REDUCE VISUALLY DETECTED DEFECTS IN AN IMAGE

(71) Applicant: ABBYY Development LLC, Moscow (RU)

(72) Inventors: Mikhail Kostyukov, Moscow (RU); Ivan Zagaynov, Moscow (RU)

(73) Assignee: ABBYY Development LLC (RU)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,081

(22) Filed: Jun. 25, 2014

(65) Prior Publication Data

US 2015/0085326 A1    Mar. 26, 2015

Related U.S. Application Data

(60) Provisional application No. 61/882,615, filed on Sep. 25, 2013, provisional application No. 61/890,014, filed on Oct. 11, 2013.

(30) Foreign Application Priority Data

Dec. 25, 2013   (RU) ................................ 2013157755

(51) Int. Cl.
*H04N 1/40*    (2006.01)
*H04N 1/409*   (2006.01)
(Continued)

(52) U.S. Cl.
CPC ............. *H04N 1/409* (2013.01); *H04N 1/387* (2013.01); *H04N 1/3871* (2013.01);
(Continued)

(58) Field of Classification Search
CPC ............. H04N 1/00047; H04N 1/0005; H04N 1/32203; H04N 1/32219; H04N 1/32224; H04N 1/32229
(Continued)

(56) References Cited

U.S. PATENT DOCUMENTS 5,982,931 A * 11/1999 Ishimaru ....................... 382/218
8,755,604 B1 * 6/2014 Gross et al. ................... 382/181
(Continued)

*Primary Examiner* — Thomas D Lee
*Assistant Examiner* — Stephen M Brinich
(74) *Attorney, Agent, or Firm* — Veronica Weinstein

(57) ABSTRACT

Systems and method for improving the quality of document images are provided. One method includes identifying a plurality of image fragments within a previously received document image that includes text. The method further includes separating the plurality of image fragments into a plurality of classes. Each class includes a subset of the plurality of image fragments that are substantially similar to one another. The method further includes, for each of the plurality of classes: (1) processing a class of image fragments to generate a combined and substantially enlarged image fragment for the class; and (2) filtering the combined and substantially enlarged image fragment to generate a filtered image fragment for the class. The method further includes generating an improved document image by replacing or modifying the image fragments within the document image based on the filtered image fragments.

22 Claims, 10 Drawing Sheets

(51) Int. Cl.
*H04N 1/393* (2006.01)
*H04N 1/387* (2006.01)

(52) U.S. Cl.
CPC .......... *H04N 1/393* (2013.01); *H04N 1/3935* (2013.01); *H04N 1/4092* (2013.01)

(58) Field of Classification Search
USPC .................. 358/2.1, 1.9, 468, 448; 382/173, 382/176–178, 180, 229, 309–310
See application file for complete search history.

(56) References Cited

U.S. PATENT DOCUMENTS

| | | | |
|---|---|---|---|
| 2010/0067794 A1* | 3/2010 | Barkan et al. | 382/182 |
| 2010/0220341 A1* | 9/2010 | Kondo | 358/1.9 |
| 2011/0268369 A1* | 11/2011 | Richards et al. | 382/284 |
| 2012/0243051 A1 | 9/2012 | Le Glaunec et al. | |
| 2014/0035910 A1 | 2/2014 | Wakai et al. | |
| 2014/0219575 A1* | 8/2014 | Govindarao et al. | 382/255 |
| 2014/0225926 A1 | 8/2014 | Mathers | |
| 2014/0270528 A1 | 9/2014 | Ramos et al. | |
| 2014/0320933 A1 | 10/2014 | Shiose | |
| 2014/0340714 A1 | 11/2014 | Hiraishi | |
| 2015/0062666 A1 | 3/2015 | Ohk | |
| 2015/0085327 A1* | 3/2015 | Kostyukov et al. | 358/451 |

* cited by examiner ot table in the spreadsheet.

Now showing

When the pivot table appears, you'll see that you can quickly and easily select a specific product from the ProductName drop-down list and view the quantity on hand and on order, along with the unit size for the product (12 bottles per case, for example). Still, why go through the trouble to view this data in Excel if you can perform a query in Access and get the same result? The primary reason is familiarity. You might be very familiar with Excel, but have no experience with Access. So, you can work in familiar surroundings without getting lost.

*FIG. 7A* ot table in the spreadsheet.

Now showing

When the pivot table appears, you'll see that you can quickly and easily select a specific product from the ProductName drop-down list and view the quantity on hand and on order, along with the unit size for the product (12 bottles per case, for example). Still, why go through the trouble to view this data in Excel if you can perform a query in Access and get the same result? The primary reason is familiarity. You might be very familiar with Excel, but have no experience with Access. So, you can work in familiar surroundings without getting lost.

*FIG. 7B* ot table in the spreadsheet.

Now showing

When the pivot table appears, you'll see that you can quickly and easily select a specific product from the ProductName drop-down list and view the quantity on hand and on order, along with the unit size for the product (12 bottles per case, for example). Still, why go through the trouble to view this data in Excel if you can perform a query in Access and get the same result? The primary reason is familiarity. You might be very familiar with Excel, but have no experience with Access. So, you can work in familiar surroundings without getting lost.

*FIG. 9B* ot table in the spreadsheet.

Now showing

When the pivot table appears, you'll see that you can quickly and easily select a specific product from the ProductName drop-down list and view the quantity on hand and on order, along with the unit size for the product (12 bottles per case, for example). Still, why go through the trouble to view this data in Excel if you can perform a query in Access and get the same result? The primary reason is familiarity. You might be very familiar with Excel, but have no experience with Access. So, you can work in familiar surroundings without getting lost.

*FIG. 9A*

METHOD AND APPARATUS AND USING AN ENLARGEMENT OPERATION TO REDUCE VISUALLY DETECTED DEFECTS IN AN IMAGE

CROSS REFERENCE TO RELATED APPLICATIONS

This application claims the benefit of priority under 35 USC 119 to both U.S. Patent Application No. 61/882,615 filed on Sep. 25, 2013 and U.S. Patent Application No. 61/089,014 filed on Oct. 11, 2014; and additionally to Russian Patent Application No. 2013157755, filed on Dec. 25, 2013; the entire specifications of which are incorporated herein by reference.

BACKGROUND

A text image (raster image of a text) received by scanning or photographing a document usually has a large quantity of artifacts and noise, which are visible during reading from a screen and printing with large resolution. The noise can be, for example, surface noise (separate noise pixels along character outlines). The similar distortions are intrinsic not only for images with text information, but also for images with graphical content (scheme, graphics, diagrams, and/or others synthetic images) as well.

There are a number of solutions for improving visual perception of a raster document image. For example, the text in a document can be recognized, and a font which is most close to an original can be selected. Unfortunately, it is not always possible to precisely fit the font, and the errors in recognition can lead to erroneous character replacing. Moreover, character recognition requires significant time and computing capability. For these reasons, character recognition is not a practical solution if only visual text improvement is required.

Another possible solution is a vectorization of a raster image. Vectorization is a complex and computationally expensive process. Further, vectorization does not ensure that the document saved in vector form will not have a larger size and/or will not include significant artifacts.

One more simple approach is using a method of image filtering. Existing methods usually do not yield a good enough result when they are applied to an image of a text. Various methods of local processing wherein improving images is based on neighboring pixel values cannot provide sufficient results.

Thus, there is a need for a document image enhancement method that utilizes special approaches that are not sufficiently developed in the areas of image processing methods and/or computer graphics.

SUMMARY

One embodiment of the present disclosure relates to a method for reducing visually detectable defects in a previously received document image. The method includes identifying, using a computing device comprising one or more processors, a plurality of image fragments within the document image. The method further includes separating, using the computing device, the plurality of image fragments into a plurality of classes. Each class of the plurality of classes includes a subset of the plurality of image fragments that are substantially similar to one another. The method further includes, for each of the plurality of classes: (1) processing, using the computing device, the class of image fragments to generate a combined and substantially enlarged image of the class; and (2) filtering, using the computing device, the combined and substantially enlarged image of the class to generate a filtered image for the class. The method further includes generating, using the computing device, an improved document image by replacing or modifying the image fragments within the document image based on the filtered images for the respective classes of the image fragments.

Another embodiment relates to a system that includes at least one computing device operably coupled to at least one memory. The at least one computing device is configured to identify a plurality of image fragments within a document image. The at least one computing device is further configured to separate the plurality of image fragments into a plurality of classes. Each class of the plurality of classes includes a subset of the plurality of image fragments that are substantially similar to one another. The at least one computing device is further configured to, for each of the plurality of classes: (1) process the class of image fragments to generate a combined and substantially enlarged image of the class; and (2) filter the combined and substantially enlarged image of the class to generate a filtered image for the class. The at least one computing device is further configured to generate an improved document image by replacing or modifying the image fragments within the document image based on the filtered images for the respective classes of the image fragments.

Another embodiment relates to a computer-readable storage medium having instructions stored thereon that, when executed by a processor, cause the processor to perform operations. The operations include identifying a plurality of image fragments within a document image. Each of the plurality of image fragments represents a one of a single character or a single character part. The operations further include separating the plurality of image fragments into a plurality of classes. Each class of the plurality of classes includes a subset of the plurality of image fragments that are substantially similar to one another, and image fragments representing a same character or same character part are grouped within a single class of the plurality of classes. The operations further include, for each of the plurality of classes: (1) normalizing image fragments of the class to generate a normalized set of image fragments of the class; (2) processing the normalized set of image fragments of the class to generate a combined and substantially enlarged image of the class; (3) filtering the combined and substantially enlarged image of the class using at least one of a rank filtering procedure and a contour filtering procedure to generate a filtered image for the class; (4) modifying each image fragment of the normalized set of image fragments of the class based on the filtered image for the class; and (5) performing an inverse normalization on each image fragment of the normalized set of image fragments to generate a final set of image fragments for the class. The operations further include generating an improved document image by replacing or modifying the image fragments within the document image based on the image fragments in the final set of image fragments for the respective classes of the image fragments.

BRIEF DESCRIPTION OF THE DRAWINGS

The disclosure will become more fully understood from the following detailed description, taken in conjunction with the accompanying figures, wherein like reference numerals refer to like elements, in which:

FIG. 7A is an illustration of a binarized image according to an exemplary embodiment;

FIG. 7B is an illustration of the binarized image of FIG. 7A with improved quality using the process shown in FIG. 5 according to an exemplary embodiment;

FIG. 9A is an illustration of a grayscale image according to an exemplary embodiment;

FIG. 9B is an illustration of the grayscale image of FIG. 9A with improved quality using the process shown in FIG. 5 according to an exemplary embodiment.

DETAILED DESCRIPTION

The present disclosure provides systems and methods that may be used to improve image quality with respect to visual perception. In some embodiments, a method may allow the user to process and save a scanned or photographed document image so that the text of the image is visually improved, similar to a digital text. In some embodiments, processing of a document image may be done in an automated manner, for example, when a document file is opened. In some embodiments, improvements may be achieved at least in part by enlarging raster images of characters and applying series of smooth and/or rank filtrations to the enlarged image portions.

In some embodiments, an exemplary system may perform enlarging and filtering for each separate character. In some embodiments, any similar character images (and/or image fragments) may be found, and then their raster image representations may be averaged. The system may subsequently enlarge and filter the averaged character images. Hereafter, a fragment should be considered a part of an image where a whole character or its part, and/or a part of a synthetic image, graph, diagram, formula, graphic image, background, etc., can be represented.

Detecting and averaging the fragments (e.g., images of similar characters) with the subsequent processing of averaged raster images may produce higher quality images than processing each fragment (e.g., character image) individually. An image including text always has a limited character set; therefore, the image typically includes repeated characters. For synthetic image portions, non-repetitive characters, and/or background image portions, self-similar image areas (fragments) can be found within the image as well.

Low visual image quality can often be the result of different kinds of noise, artifacts, and/or other defects. In some embodiments, an image processing method may identify all instances of a particular image fragment type (e.g., a character or part of a character) within a received image. Often, the different instances of identical or substantially similar fragments (e.g., a particular character) can be damaged differently (e.g., defects and noise can differ, or can arise in different parts of a character). In such cases, the defective characters may be restored by special calculated filtering, as described in further detail below.

Figure 1:
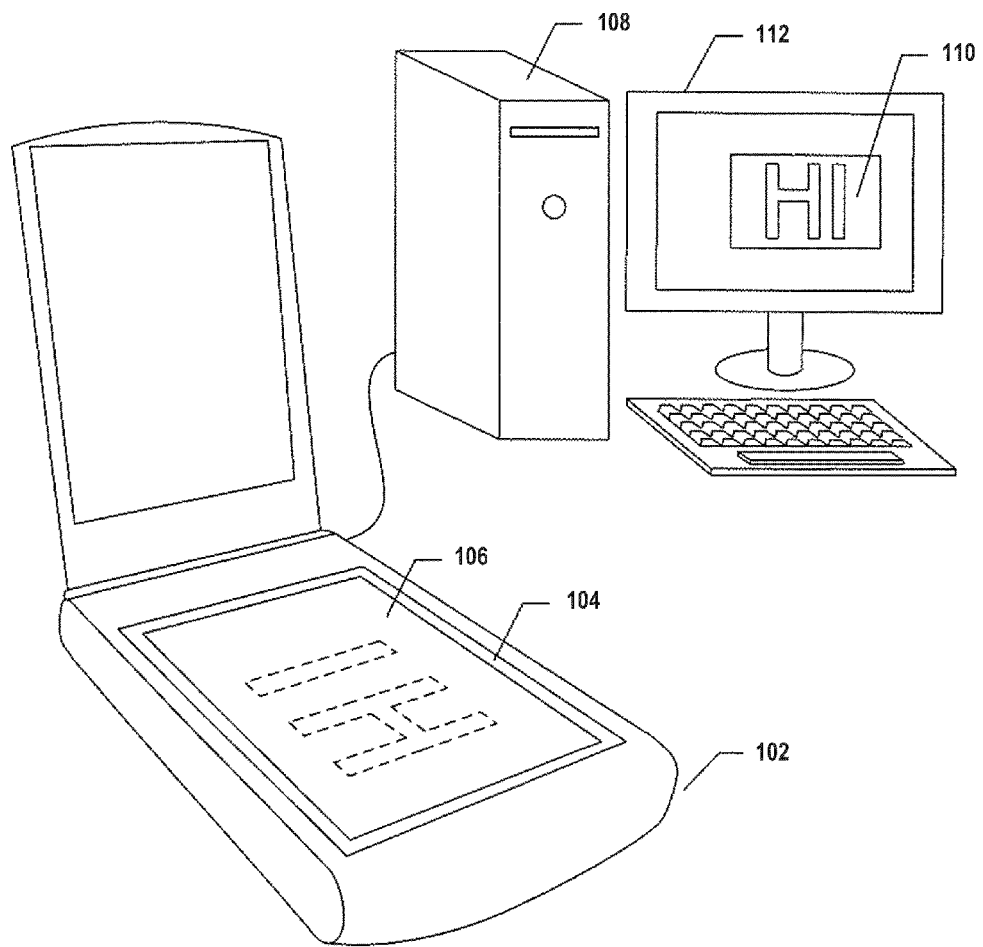
FIG. 1 illustrates a typical desktop scanner and personal computer that are together used to convert printed documents into digitally encoded electronic documents stored in mass-storage devices and/or electronic memories according to an exemplary embodiment.

Printed documents can be converted into digitally encoded, scanned-document images by various means, including electro-optico-mechanical scanning devices and digital cameras. FIG. 1 illustrates a typical desktop scanner and personal computer that are together used to convert printed documents into digitally encoded electronic documents stored in mass-storage devices and/or electronic memories. The desktop scanning device 102 includes a transparent glass bed 104 onto which a document is placed, face down 106. Activation of the scanner produces a digitally encoded scanned-document image which may be transmitted to the personal computer ("PC") 108 for storage in a mass-storage device. A scanned-document-image-rendering program may render the digitally encoded scanned-document image for display 110 on a PC display device 112.

Figure 2:
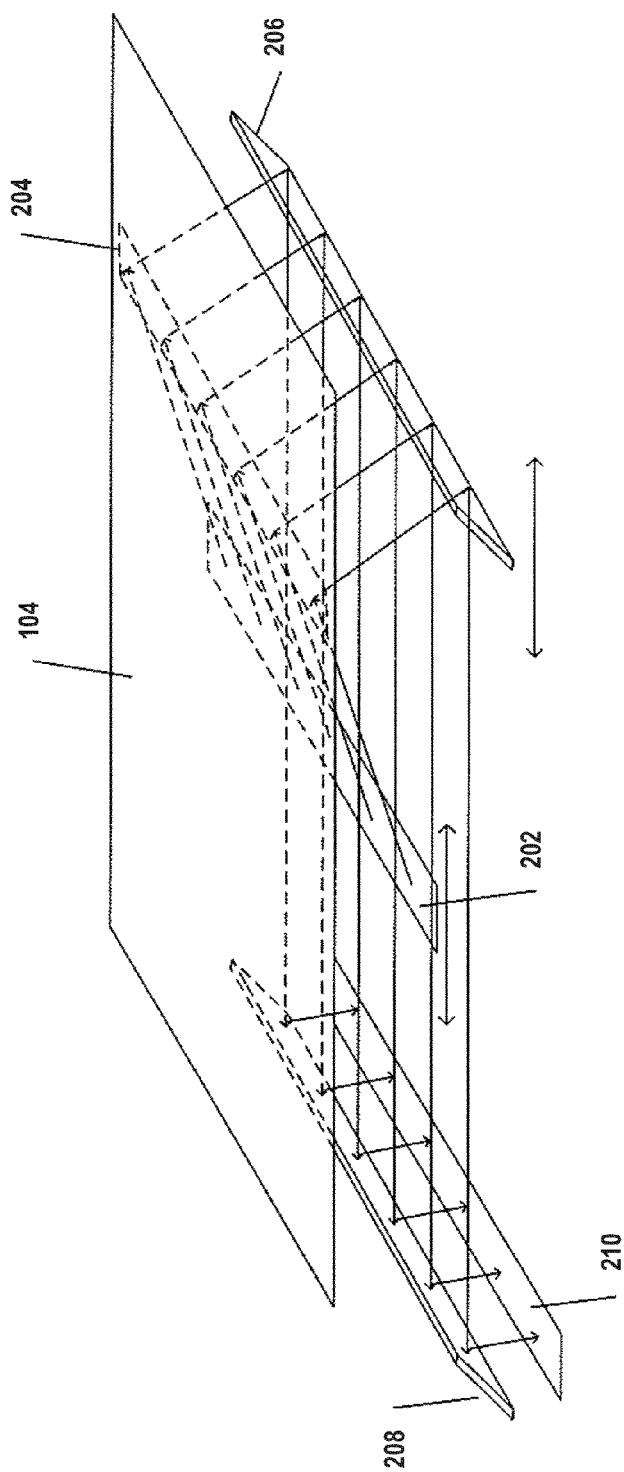
FIG. 2 illustrates operation of the optical components of the desktop scanner shown in FIG. 1 according to an exemplary embodiment.

FIG. 2 illustrates operation of the optical components of the desktop scanner shown in FIG. 1. The optical components in this charge-coupled-device ("CCD") scanner reside below the transparent glass bed 104. A laterally translatable bright-light source 202 illuminates a portion of the document being scanned 204 which, in turn, re-emits and reflects light downward. The re-emitted and reflected light is reflected by a laterally translatable minor 206 to a stationary mirror 208, which reflects the emitted light onto an array of CCD elements 210 that generate electrical signals proportional to the intensity of the light falling on each of the CCD elements. Color scanners may include three separate rows or arrays of CCD elements with red, green, and blue filters. The laterally translatable bright-light source and laterally translatable minor move together along a document to produce a scanned-document image. Another type of scanner is referred to as a "contact-image-sensor scanner" ("CIS scanner"). In a CIS scanner, moving colored light-emitting diodes ("LEDs") provide document illumination, with light reflected from the LEDs sensed by a photodiode array that moves together with the colored light-emitting diodes.

Figure 3:
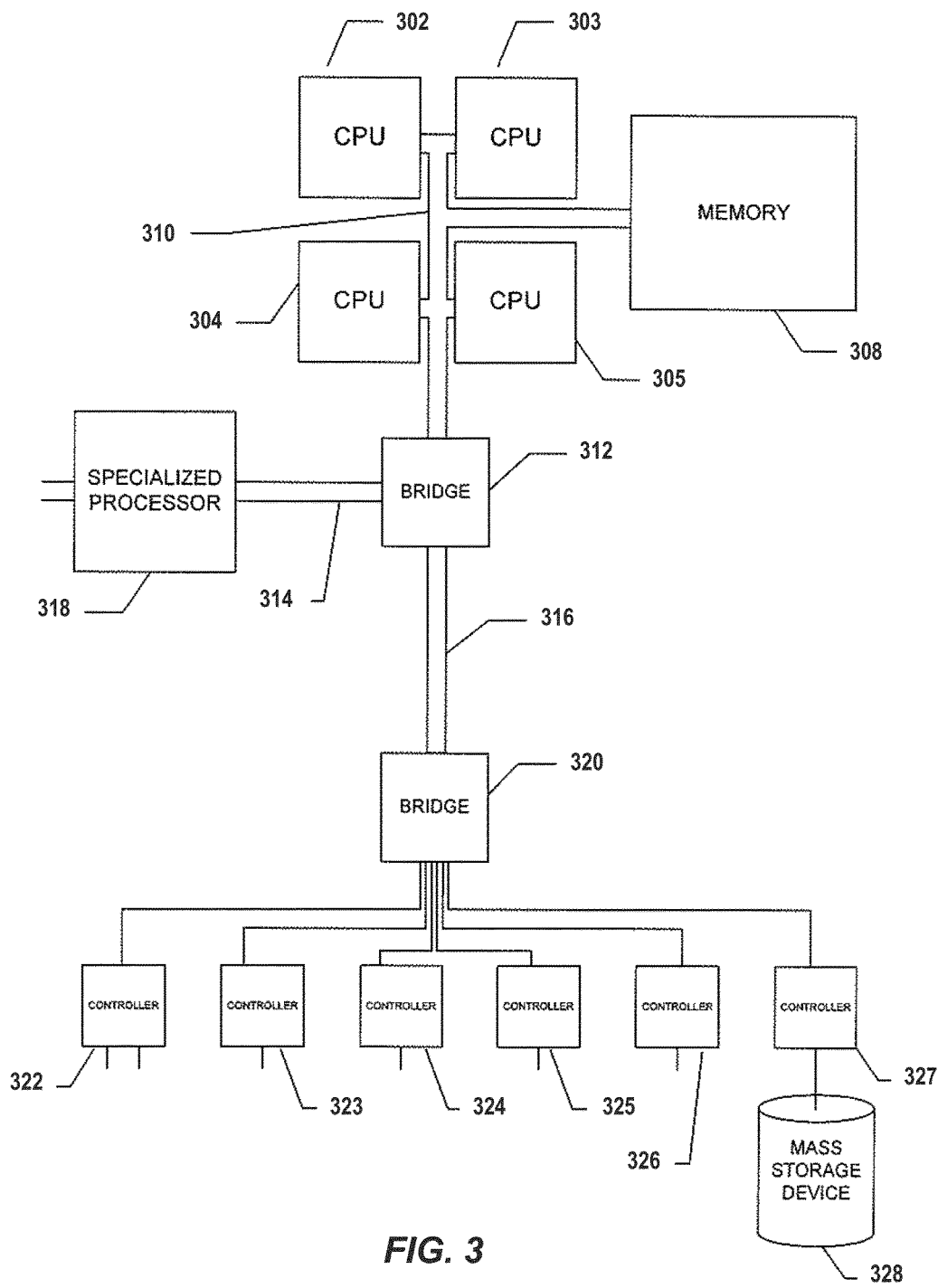
FIG. 3 provides a general architectural diagram for various types of computers and other processor-controlled devices according to an exemplary embodiment.

FIG. 3 provides a general architectural diagram for various types of computers and other processor-controlled devices. The high-level architectural diagram may describe a modern computer system, such as the PC in FIG. 1, in which scanned-document-image-rendering programs and optical-character-recognition programs are stored in mass-storage devices for transfer to electronic memory and execution by one or more processors to transform the computer system into a specialized optical-character-recognition system. The computer system contains one or multiple central processing units ("CPUs") 302-305, one or more electronic memories 308 interconnected with the CPUs by a CPU/memory-subsystem bus 310 or multiple busses, a first bridge 312 that interconnects the CPU/memory-subsystem bus 310 with additional busses 314 and 316, or other types of high-speed interconnection media, including multiple, high-speed serial interconnects. These busses or serial interconnections, in turn, connect the CPUs and memory with specialized processors, such as a graphics processor 318, and with one or more additional bridges 320, which are interconnected with high-speed serial links or with multiple controllers 322-327, such as controller 327, that provide access to various different types of mass-storage devices 328, electronic displays, input devices, and other such components, subcomponents, and computational resources.

Figure 4:
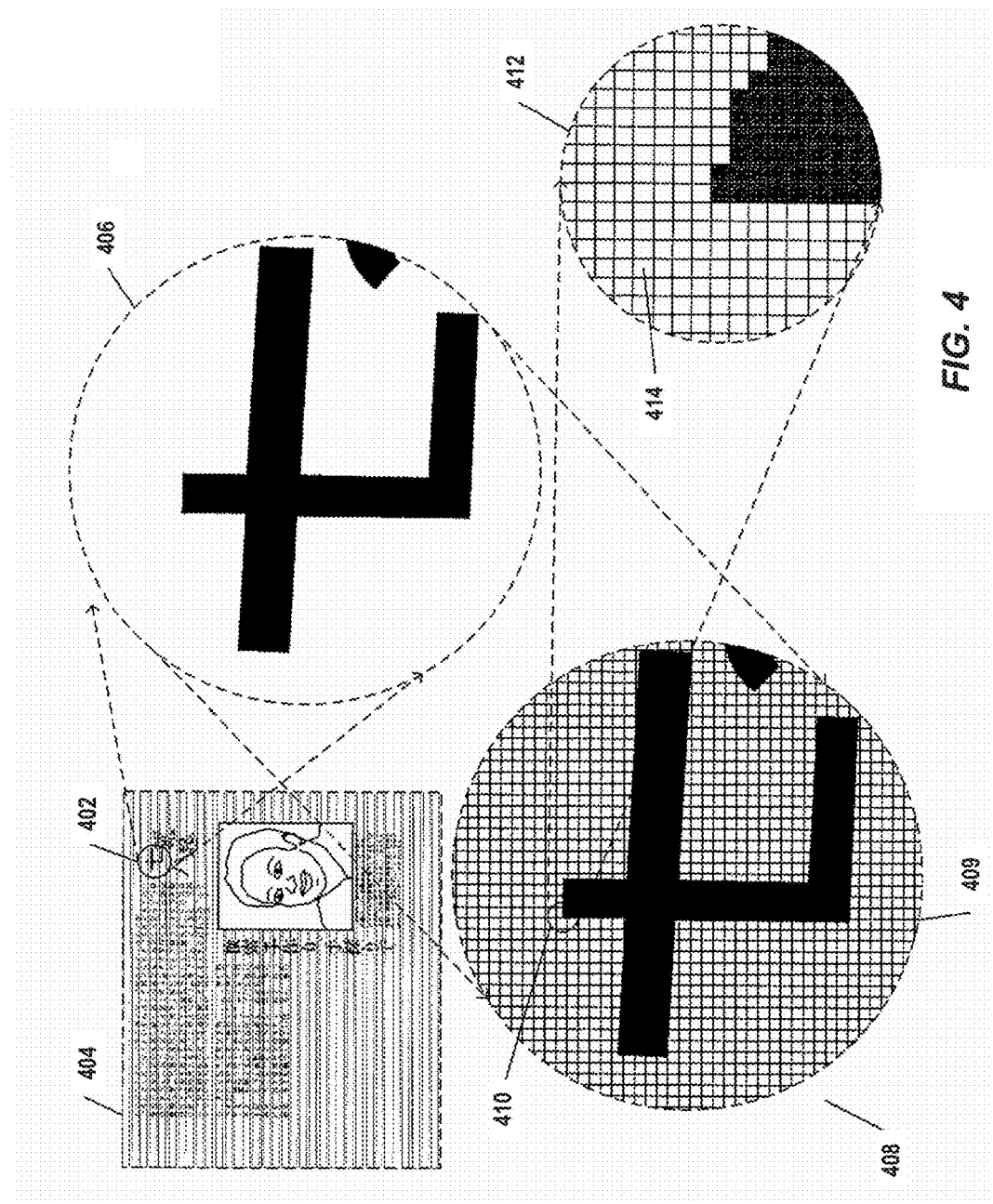
FIG. 4 illustrates digital representation of a scanned document according to an exemplary embodiment.

FIG. 4 illustrates digital representation of a scanned document. In FIG. 4, a small disk-shaped portion 402 of the example printed document 404 is shown magnified 406. A corresponding portion of the digitally encoded scanned-document image 408 is also represented in FIG. 4. The digitally encoded scanned document includes data that represents a two-dimensional array of pixel-value encodings. In the representation 408, each cell of a grid below the characters, such as cell 409, represents a square matrix of pixels. A small portion 410 of the grid is shown at even higher magnification, 412 in FIG. 4, at which magnification the individual pixels are represented as matrix elements, such as matrix element 414. At this level of magnification, the edges of the characters appear jagged, since the pixel is the smallest granularity element that can be controlled to emit specified intensities of light. In a digitally encoded scanned-document file, each pixel is represented by a fixed number of bits, with the pixel encodings arranged sequentially. Header information included in the file indicates the type of pixel encoding, dimensions of the scanned image, and other information that allows a digitally encoded scanned-document-image rendering program to extract the pixel encodings and issue commands to a display device or printer to reproduce the pixel encodings in a two-dimensional representation of the original document. Scanned-document images digitally encoded in monochromatic grayscale commonly use 8-bit or 16-bit pixel encodings, while color scanned-document images may use 24 bits or more to encode each pixel according to various different color-encoding standards. As one example, the commonly used RGB standard employs three 8-bit values encoded within a 24-bit value to represent the intensity of red, green, and blue light. Thus, a digitally encoded scanned image generally represents a document in the same fashion that visual scenes are represented in digital photographs. Pixel encodings represent light intensity in particular, tiny regions of the image and, for colored images, additionally represent a color. There is no indication, in a digitally encoded scanned-document image, of the meaning of the pixels encodings, such as indications that a small two-dimensional area of contiguous pixels represents a text character. The image of the text-containing region can be converted from a pixel-based image to a bitmap, in a process referred to as "binarization," with each pixel represented by either the bit value "0," indicating that the pixel is not contained within a portion of a text character, or the bit value "1," indicating that the pixel is contained within a text character. The bit-value convention is, of course, arbitrary, and an opposite convention can be employed, with the value "1" indicating background and the value "0" indicating character.

By contrast, a typical electronic document produced by a word-processing program contains various types of line-drawing commands, references to image representations, such as digitally encoded photographs, and digitally encoded text characters. One commonly used encoding standard for text characters is the Unicode standard. The Unicode standard commonly uses 8-bit bytes for encoding American Standard Code for Information Exchange ("ASCII") characters and 16-bit words for encoding symbols and characters of many languages, including Japanese, Mandarin, and other non-alphabetic-character-based languages. A large part of the computational work carried out by an OCR program is to recognize images of text characters in a digitally encoded scanned-document image and convert the images of characters into corresponding Unicode encodings. Clearly, encoding text characters in Unicode takes far less storage space than storing pixilated images of text characters. Furthermore, Unicode-encoded text characters can be edited, reformatted into different fonts, and processed in many additional ways by word-processing programs while digitally encoded scanned-document images can only be modified through specialized image-editing programs. It should be appreciated that the illustrated embodiments shown and described with respect to FIGS. 1-4 are provided merely for purposes of example, and the methods described herein are not limited to the particular implementations described in those figures. In various embodiments, an original document image may be acquired from a scanning device, a photographic device (e.g., a photo camera), another device configured with a camera (e.g., mobile devices, such as smartphones, phones, tablets, laptops, etc.), a file stored in a memory of a computing device, an email account, an online storage account, or any other source from which document image data may be received.

Figure 5:
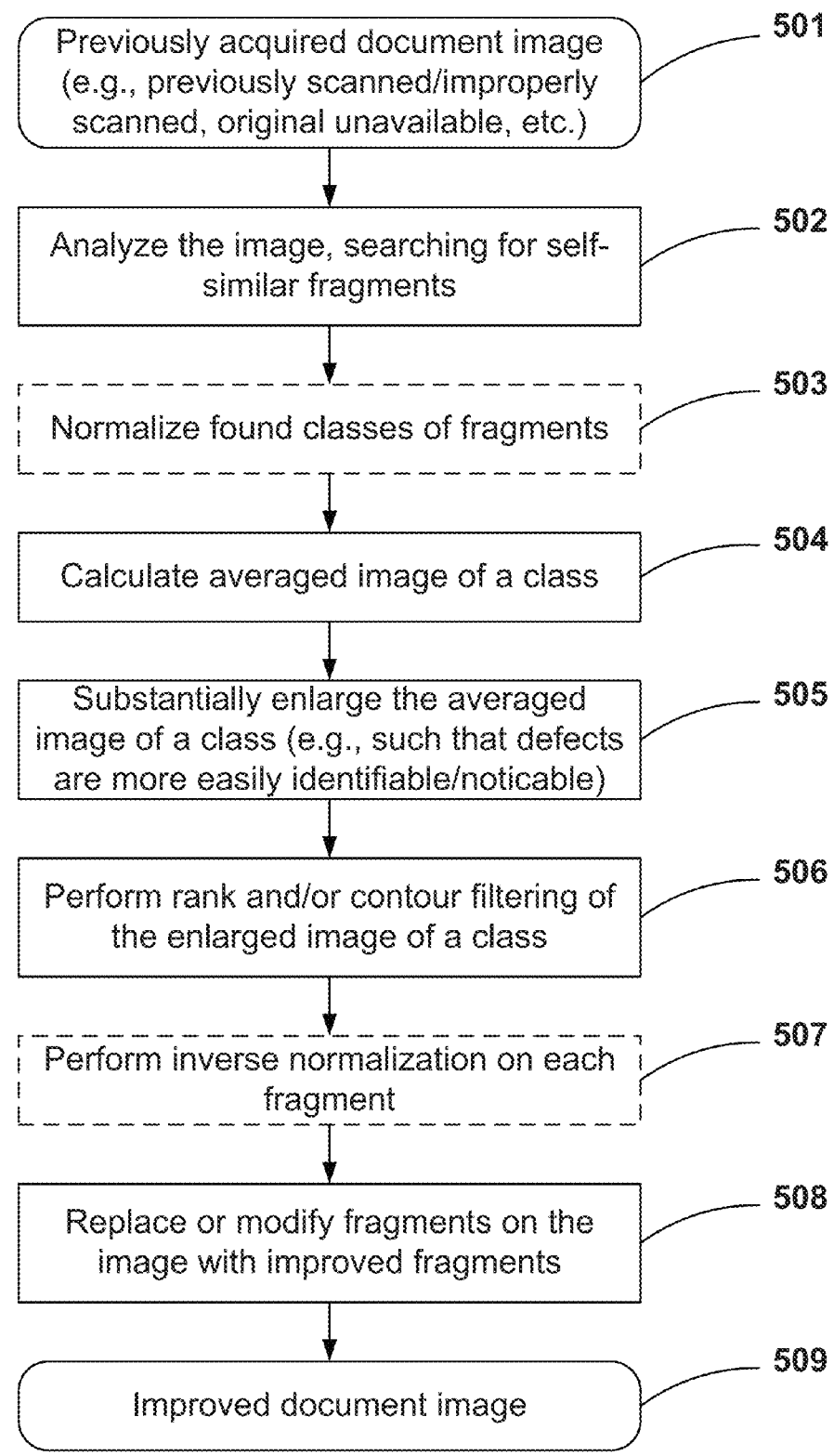
FIG. 5 is a flow diagram of a process for improving the image quality of a document image according to an exemplary embodiment.

Referring now to FIG. 5, a process for improving the quality of at least a portion of an image (e.g., an image including text) is shown according to an exemplary embodiment. An image processing system may acquire or have previously received an original document image (501). In some embodiments, the original document image may be included within a data file received by the system (e.g., a PDF, TIFF, JPEG, RAW, GIF, BMP, PNG, word processing document, spreadsheet, presentation slide set, and/or any other type of file format capable of representing and/or including image data). In some embodiments, the original document image may be acquired from a scanning device, such as a standalone scanner, a multifunction copier/scanner device, or another device configured to scan an image from a printed substrate (e.g., paper). In various embodiments, the system may receive the original document from a user of the system or from a third party (e.g., a party different from the user). In some embodiments, the system may receive the original document after the quality of the document has been degraded from its original form (e.g., to lower a file size prior to transmission over a data network, as a result of a scanning procedure at a scanning device, etc.), and the process shown in FIG. 5 may be used to at least partially restore the quality of the document. In some embodiments, the system may be able to improve the quality of a scanned document image with quality defects, or reduced quality from an original (e.g., paper) document (e.g., an improperly scanned document), without the need to obtain the original document (e.g., in the event the original document is unavailable or not easily obtained), and/or without requiring the original document to be rescanned with manual changes (e.g., grayscale changes) at the scanning device to improve the quality of the document image.

The system may be configured to analyze the image and segment the image into similar image fragment portions (502). The system may search for self-similar areas in the image by determining a degree of similarity between different areas in the image. In some embodiments in which the image part contains text, the system may be configured to segment areas of the image in a manner such that each segment area contains a single character. In some embodiments, the combined segments may cover less than the entire original image. In some embodiments, self-similar areas may be overlapping. In some embodiments, the system may quickly search for similar fragments in an image containing text using a rough optical character recognition (OCR) technique or algorithm. The system may classify the recognized same characters as part of a single class of characters or image fragments.

To locate similar fragments in an image, a metric defining a degree of similarity of detected fragments may be selected. The system may determine fragments that are substantially similar to be part of a class of fragments, where any fragment from the class is a class member. The system may determine whether fragments below to a particular class based at least in part on whether a metric associated with the fragments does not exceed a threshold value of the selected metric. The dimension of a class is determined by a number of fragments in the class (e.g., such that a class with a dimension of one includes a single fragment, a class with a dimension of five includes five fragments, etc.). A non-repetitive fragment (i.e., not having a self-similar fragment) may form a separate class with dimension equal to one, so that an enhancement may be implemented in all image areas. Each class includes a subset of the identified fragments within the document. For example, a first class may include the subset of fragments including the character 'a', a second class may include the subset of fragments including the character 'b', and so on.

In some embodiments, a degree of similarity of detected fragments can be defined with measures such as Mean Squared Error (MSE) or Mean Absolute Error (MAE). Such measures may be simple, but may not provide as precise a measure of a degree of similarity for two images as can be obtained through subjective evaluation.

In some embodiments, a different measure of similarity may be used, e.g., correlation of two images, Hausdorff distance, or different modifications of various metrics. Metrics like Hausdorff distance are more precise in measuring similarity than MAE, but also require more resources to calculate.

In some embodiments, both measures can be used during different stages. For example, in some embodiments, the system may utilize a metric such as MAE or MSE to provide a rough estimate of similarity in a first fast stage in which classes are identified, and may use a different metric (e.g., a more precise metric, such as Hausdorff distance) for identifying members of the classes.

In some embodiments, the system may perform further processing on detected similar fragments to normalize a size, shape, and/or other characteristics of the fragments within each class (503). For example, a size and/or shape of the fragments may be normalized, such that the normalized fragments have a substantially uniform size and/or shape after processing. If the original image is color or grayscale, fragments may be normalized to a uniform degree of brightness and contrast. In some embodiments, for color fragments, tint normalization may also be performed. In some embodiments, the system may be configured to normalize fragments within a class by using normalization settings and adjusting to a uniform degree (equalization) one or multiple image parameters, such as brightness, contrast, saturation, intensity, hue, tint, gamma correction, etc. For black-and-white (binarized) images, normalization (e.g., color and/or brightness normalization) may not be needed; selecting fragments with identical or substantially similar size may be sufficient.

Normalization can be performed using a variety of different methods. In some embodiments, transformation of brightness and contrast can be computed for each image fragment based on the characteristics of its histogram with use of histogram equalization.

Figure 6:
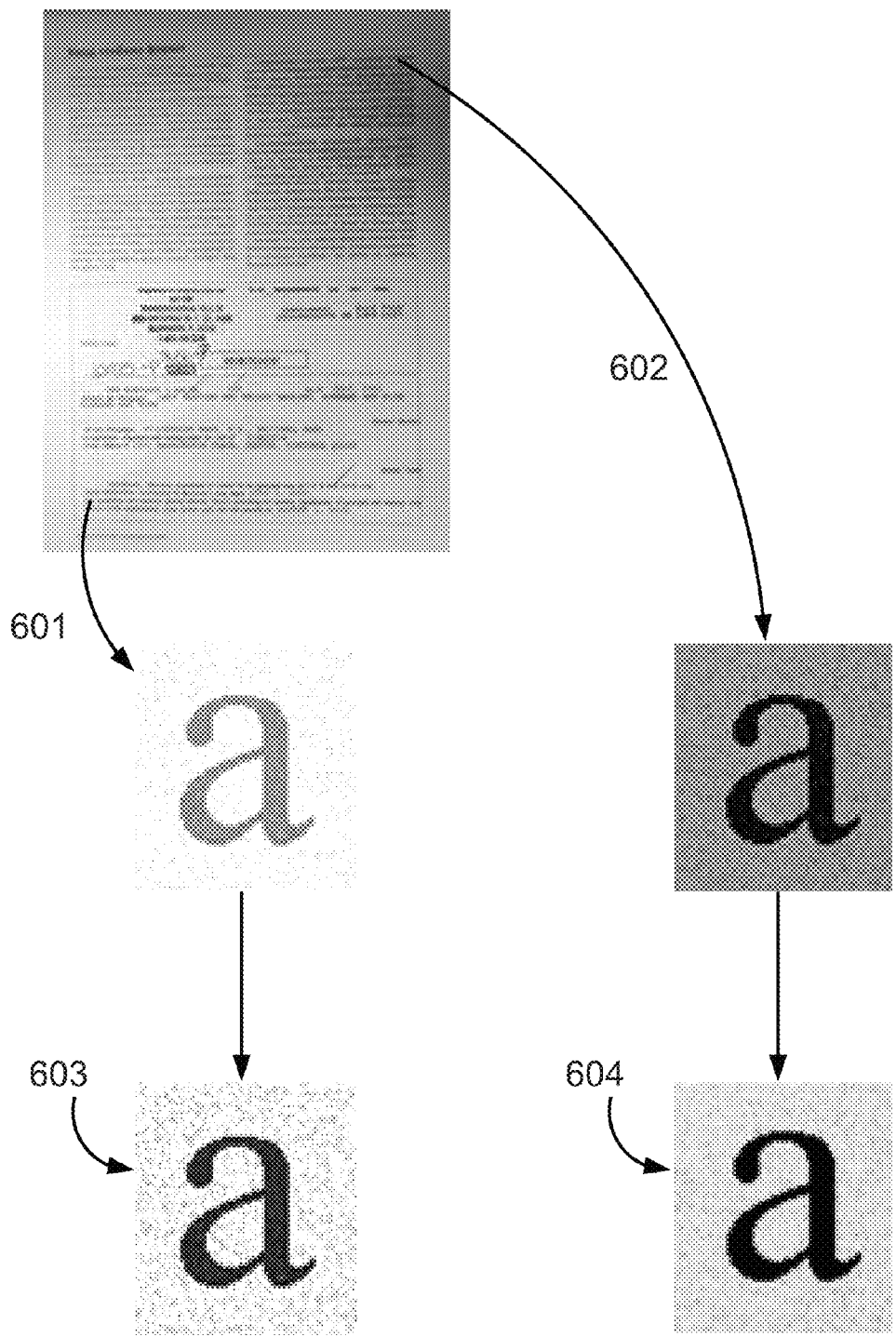
FIG. 6 is an illustration of portions of an image modified using a histogram function according to an exemplary embodiment.

In some embodiments, a histogram may be used, and may be a function that identifies, for each brightness value, a number of pixels having such brightness. Usually, this function can be represented by a graph, where the x axis is a scale of brightness values (e.g., from 0 to 255), and the y axis shows a number of pixels in an image or image fragment having this brightness value. Hence, a histogram of a dark portion of an image, such as dark image portion 602 shown in FIG. 6, will be mostly "shifted" to the left. Conversely, the histogram of a light portion of an image, such as light image portion 601 shown in FIG. 6, will be mostly shifted to the right. After bringing similar fragments to a uniform contrast range, the system may perform histogram equalization, so that a brightness distribution in a histogram of a fragment become more even (see, e.g., processed light image fragment 603 and processed dark image fragment 604 of FIG. 6). As a result of the normalization of the image fragments within a class, the histograms of all fragments within the class may be similar.

In some embodiments, normalization parameters applied to a given fragment and/or functions associated with each histogram transformation may be stored for each fragment to allow the system to later apply inverse normalization transformations (see 507).

Figure 8A:
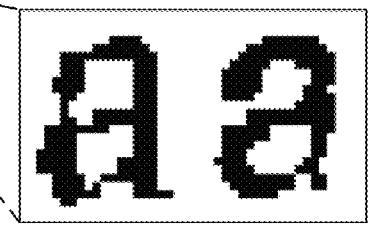
FIG. 8A is an illustration of a class of similar image fragments detected within an image according to an exemplary embodiment.

FIG. 7A shows an illustration of a binarized image according to an exemplary embodiment. FIG. 8A shows an illustration of a particular class of similar fragments, corresponding to the character 'a', detected within the image shown in FIG. 7A. As can be seen in FIG. 8A, there are visible differences between the different image fragments of the class shown in FIG. 8A prior to the image processing operations 504-508 of FIG. 5 are performed.

Referring again to FIG. 5, using a class of fragments (e.g., normalized fragments from one class), the system can generate a combined image of fragments for the class (e.g., an averaged or weighted average image of the class) (504). In some embodiments, the averaged image of a class may be grayscale in the case of black-and-white or grayscale fragments (if original image was black-and-white or grayscale), and the value of every pixel may be computed as a mean value of brightness of the corresponding pixels in the fragments of the class.

A formula for computation of pixel brightness of an averaged image, according to one exemplary embodiment, is given by:

$$\tilde{F}(x, y) = \frac{1}{N} \sum_{k=1}^{N} F_k(x, y),$$

where N is the dimension of the class, and $F_k$, k=1, N are images of fragments in a class.

The averaged image of a class may be color in case of color fragments, and can be computed similarly, depending on a color model. For example, for an RGB model, a mean value of each color parameter (red, green and blue) for a pixel can be computed.

In some embodiments, more complex averaging methods may be used. For example, instead of using an averaged image, a weighted average image of a class may be calculated using certain estimates (weights) for each fragment in a class.

Figure 8B:
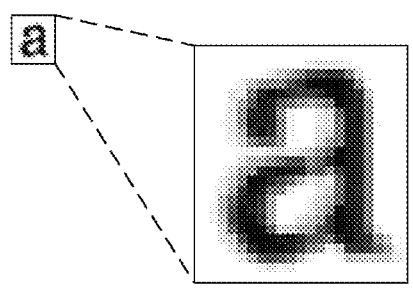
FIG. 8B is an illustration of an averaged image for the class of similar image fragments shown in FIG. 8A according to an exemplary embodiment.

FIG. 8B illustrates an averaged image for the class of character 'a' image fragments shown in FIG. 8A that may result from an averaging operation such as operation (504) according to an exemplary embodiment.

In some embodiments, combination methods other than averaging may be used.

Figure 8C:
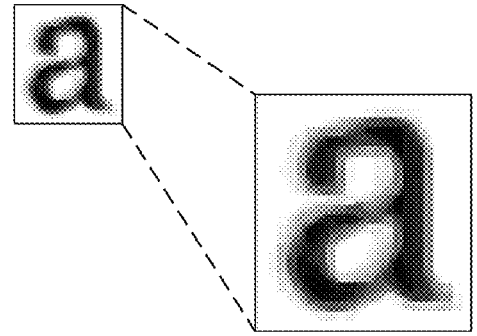
FIG. 8C is an illustration of an enlarged image of the class obtained from the averaged image for the class of FIG. 8B according to an exemplary embodiment.

Referring again to FIG. 5, various filtering methods for processing of grayscaled and/or colored images can be applied to the averaged image. In some embodiments, the system may be configured to substantially enlarge the received averaged images of classes (505) and/or perform a special filtration on the image fragments (506). In order to obtain a better visual quality, an image scaling method (e.g., bilinear interpolation, bicubic spine interpolation, pixel art scaling algorithms, etc.), which takes into consideration pixel values in the neighborhood of a pixel being expanded, may be used. FIG. 8C shows an illustration of an enlarged image of the class obtained from the averaged image of the class of FIG. 8B according to an exemplary embodiment. In some embodiments, the system may enlarge the images of classes to a multiple of the original size of the image fragment(s) (e.g., 2×, 3×, 5×, etc.). In some embodiments, the system may substantially enlarge the images of classes such that the image fragment(s) are noticeably larger when presented to the user and defects in the document are more noticeable to the viewer. In some embodiments, the system may substantially enlarge the images of classes such that, when using a mobile computing device and viewing the document image on a small display screen, the images of classes may be enlarged to a size that is readable by a user.

In some embodiments, the system may be configured to enlarge the image fragments before generating the averaged image of the fragments for a class. In such embodiments, an averaged image of a class may be calculated using the enlarged fragments.

Referring again to FIG. 5, appearance of different noise and artifacts on contours (outlines) of objects or parts of objects is inevitable, even after scaling an averaged image. To reduce noises and make contours smoother, a special filter can be used (506). Such a filter may take into consideration the nature of the artifacts typical for a chosen scaling method and/or information contained in an image (text information, graphic, etc.).

In some embodiments, in the case of scaling with bilinear or bicubic interpolation, the filter is a nonlinear, two-dimensional rank operator with a (2r+1)*(2r+1) squared window. The window covers a current pixel (in the center) and considers its neighboring pixels. For each element in the window, a convolution with a preset kernel may be calculated.

The system may then sort the received values in ascending order, and an element with number ((2r+1)*(2r+1)+1)/2 in a sorted array may be a result of a rank operator. Such a filter may substantially reduce mixed uniform noise and impulse noise around contours of objects.

For instance, in some embodiments, the following parameters can be used. In case of 3 times scaling with bicubic interpolation, the smoothing may be performed by the described filter, where convolution is being run with a 3×3 kernel of the following type:

1/16 2/16 1/16
2/16 4/16 2/16
1/16 2/16 1/16.

The image smoothed by such a filter may be exposed to further processing. For example, in some embodiments, further contour filtration, such as the filtration techniques described below, may be performed.

In some embodiments, e.g. for non-text images (or image areas), collaborative filtering and/or Wiener filtering may be used. A collaborative filtering procedure may operate to find similar fragments, which may be partly overlapping, and collect them in a set one by one (like a pile), then perform a joint filtering of that set. In some embodiments, the system may utilize the Block-Matching and 3D (BM3D) filtering algorithm or a similar collaborative algorithm.

If the original image is black-and-white, then the resulting image may be black-and-white as well. In such embodiments, the previously smoothed image may be binarized, and then a coordinate filter may process the contour points. Coordinates of points can be considered as one-dimensional signals $x_i$ and $y_i$. A one-dimensional signal may be processed by the filter by averaging, Gaussian smoothing, Butterworth filtering, or other types of filter processing methods. In some embodiments, recursive filtering processes may be used. Then, the received coordinates of contour points may be redrawn in a final image.

In some embodiments, if the original image is grayscale or color, then raster contour filtration may be performed. First, the contour areas where a space smoothing procedure along the length of a contour line should be made are found. For this purpose, a gradient in every point of an image may be computed. A gradient module and its direction can indicate the necessary smoothing required. Smoothing in areas of sharp step changes of gradient direction may be avoided. Higher results may be achieved if smoothing is performed iteratively until the desired degree of smoothness has been reached.

Figure 8D:
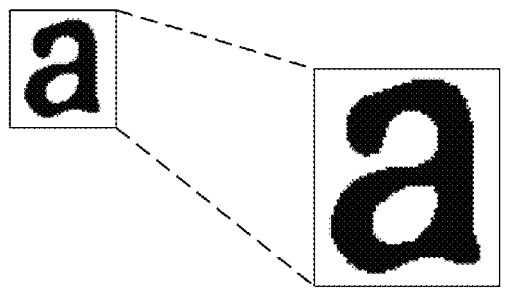
FIG. 8D is an illustration of an improved image of the class after further processing is performed on the enlarged image of FIG. 8C according to an exemplary embodiment.

After applying all desired improving filters to the enlarged averaged image of a class, the improved large image of the class will have higher visual quality. For example, FIG. 8D shows an illustration of an improved image of the class after filter processing is performed on the image of FIG. 8C according to an exemplary embodiment.

A simplified procedure of visual enhancement may be performed for classes with dimension equal to one (if only one fragment created the class). For example, in some such embodiments, only the contour filter may be applied, or the contour filter may be applied in combination with only a set of additional simplified filters. In some embodiments, all non-repetitive fragments are processed together within the framework of the original image.

In some embodiments, the improved averaged image of a class may be utilized as a replacement for each class member within the larger image. In some embodiments, from the improved averaged image of a class, an improved fragment for each class member can be obtained by means of inverse normalization transformation (507). Parameters of inverse normalization can be obtained for each fragment on the basis of parameters which were used to normalize the fragment.

The original image may be improved by modifying the image fragments associated with each class based on the processed representative (e.g., averaged) image for the class and/or the inverse-normalized class members (508). In some embodiments, the fragments in the original image may be replaced with the improved image fragments or with the improved image of corresponding class. In some embodiments, the fragments in the original image may be modified based on the improved image fragments to improve the quality of the original fragments. The resultant document image may be an improved document image having a higher quality than the original document image (509). For example, FIG. 7B shows an improved version of the binarized image shown in FIG. 7A after a process such as the process shown in FIG. 5 has been applied according to an exemplary embodiment. In the grayscale context, FIG. 9B shows an improved version of a grayscale image shown in FIG. 9A after a process such as the process shown in FIG. 5 has been applied according to an exemplary embodiment.

In some embodiments, a process such as the process shown in FIG. 5 may be applied in such technologies as MRC (Mixed Raster Content) compression to obtain a better quality of a monochrome mask. Using such an improved mask may result in better visual quality of text in compressed files.

In some embodiments, a process such as the process shown in FIG. 5 may be applied to a broad variety of types of images. If the characteristics of processed images are initially known, then more specific parameters and filters can be used. Moreover, preliminary profiles with adjusted parameters can be created for different image types, allowing a user to choose a profile in correspondence with the image to be processed. In some embodiments, profiles may be automatically chosen by the system using image processing and/or recognition methods.

In some embodiments, a process such as the process shown in FIG. 5 may be used to improve the quality of a portion of an image, rather than the entire image. For example, a selection of an image portion may be received from a user input device of a user device. In some embodiments, the selection may be made via a touch-screen display device of a mobile computing device, such as a smartphone, tablet, laptop, etc. For example, a user may pinch, double-tap, or otherwise provide input indicating a desire to zoom in on a portion of a displayed document image. In response, the user device may display an enlarged representation of the selected portion of the document image. The user device and/or a server device serving the document image may be configured to perform processing to provide a greater level of detail for the displayed enlarged portion than is shown in the normal, full document image view.

In some embodiments, the system (e.g., the user device and/or a server device providing the document image to the user device) may be configured to perform processing similar to the operations shown in FIG. 5 to generate an enlarged image portion having a higher image quality. The system may analyze the selected image portion and separate the image portion into image fragments. In some embodiments, the system may process the entire document image to identify similar image fragments for inclusion within the classes of image fragments. Including the entire document in the image fragment classification may improve the quality of the final enlarged image portion, because the averaging and/or filtering steps may be based on a larger number of image fragment samples from the document image. In some embodiments, the image fragment classification may be performed based only on the fragments (e.g., characters) included within the selected image portion. Using only the selected image portion may decrease the computational resources required to perform the image processing operations.

Once the image fragments have been separated into classes, the fragments can be averaged, enlarged, and/or filtered according to the operations shown in FIG. 5 and described in detail above. In some embodiments, the system may substantially enlarge the images of classes such that, when viewing the document image on a small display screen of a mobile computing device such as a smartphone, the image fragment(s) may be enlarged to a size customarily readable by a user. The resultant processed image fragments may be used to replace or otherwise modify the image fragments included within the selected area to generate an enlarged area having an improved image quality. The improved enlarged area may then be displayed on the user device. In some embodiments, this process may be performed as a background process (e.g., when the process is hidden from a user). In some embodiments, parameters, results, and/or other data associated with the performed processing may be stored in memory to allow for faster processing of other areas within the document image. In some embodiments, the entire document image may be improved at the time the selected portion is improved, but only the selected portion may be displayed to the user until the user zooms out of the selected area.

Figure 10:
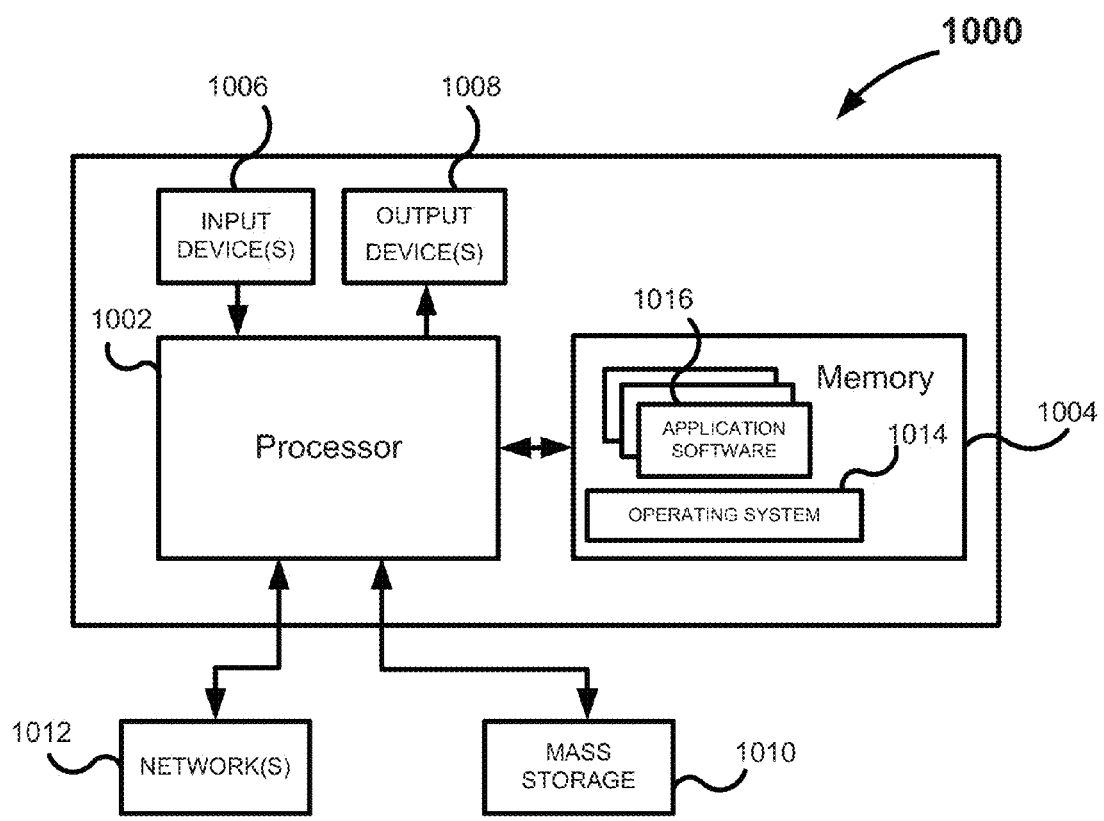
FIG. 10 is a block diagram of a system for improving the image quality of an image according to an exemplary embodiment.

FIG. 10 shows a system 1000 that may enhance a text image using the techniques described above, in accordance with some embodiments of the disclosure. The system 1000 typically includes at least one processor 1002 coupled to a memory 1004. The processor 1002 may represent one or more processors (e.g., microprocessors), and the memory 1004 may represent random access memory (RAM) devices comprising a main storage of the system 1000 and/or any supplemental levels of memory e.g., cache memories, non-volatile or back-up memories (e.g. programmable or flash memories), read-only memories, etc. In addition, the memory 1004 may include memory storage physically located elsewhere in the system 1000 (e.g. any cache memory in the processor 1002) as well as any storage capacity used as a virtual memory (e.g., as stored on a mass storage device 1010).

Typically, the system 1000 also receives a number of inputs and outputs for communicating information externally. The system 1000 may include one or more user input devices 1006 (e.g., a keyboard, a mouse, a scanner etc.) and a display 1008 (e.g., a Liquid Crystal Display (LCD) panel) for interfacing with a user/operator. For additional storage, the system 1000 may also include one or more mass storage devices 1010, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 1000 may include an interface with one or more networks 1012 (e.g., a local area network (LAN), a wide area network (WAN), a wireless network, and/or the Internet among others) to permit the communication of information with other computers coupled to the networks. It should be appreciated that the system 1000 typically includes suitable analog and/or digital interfaces between the processor 1002 and each of the components 1004, 1006, 1008 and 1012 as is well known in the art.

The system 1000 operates under the control of an operating system 1014, and executes various computer software applications, components, programs, objects, modules, etc. indicated collectively by reference number 1016 to perform the correction techniques described above.

In general, the routines executed to implement the embodiments of the disclosure may be used as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the disclosure. Moreover, while the invention has been described in the context of fully functioning computers and computer systems, those skilled in the art will appreciate that the various embodiments of the disclosure are capable of being distributed as a program product in a variety of forms, and that the disclosure applies equally regardless of the particular type of machine or computer-readable media used to actually affect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links. Computer-readable media, as included within the present disclosure, include only non-transitory media (i.e., do not include transitory signals-in-space).

Although the present disclosure has been provided with reference to specific exemplary embodiments, it is evident that the various modifications can be made to these embodiments without changing the initial spirit of the invention. Accordingly, the specifications and drawings are to be regarded in an illustrative sense rather than in a restrictive sense.

What is claimed is:

1. A method for reducing visually detectable defects in a document image, the method comprising:
   identifying, using a computing device comprising one or more processors, a plurality of image fragments within the document image;
   separating, using the computing device, the plurality of image fragments into a plurality of classes, wherein each class of the plurality of classes includes a subset of the plurality of image fragments that are substantially similar to one another;
   for each of the plurality of classes:
   processing, using the computing device, the class of image fragments to generate a combined and substantially enlarged image of the class, wherein the processing of the class of image fragments comprises:
      generating a combined image of the class based on image fragments of the class; and
      generating the combined and substantially enlarged image of the class by substantially enlarging the combined image of the class;
   filtering, using the computing device, the combined and substantially enlarged image of the class to generate a filtered image for the class; and
   generating, using the computing device, an improved document image by replacing or modifying the image fragments within the document image based on the filtered images for the respective classes of the image fragments.

2. The method of claim 1, wherein processing the class of image fragments to generate the combined and substantially enlarged image of the class comprises:
   substantially enlarging image fragments of the class to generate substantially enlarged image fragments; and
   combining the substantially enlarged image fragments to generate the combined and substantially enlarged image of the class.

3. The method of claim 1, further comprising, for each of the plurality of classes, normalizing the image fragments of the class prior to processing the class of image fragments to generate the combined and substantially enlarged image of the class.

4. The method of claim 3, further comprising, for each of the plurality of classes, performing an inverse normalization on each image fragment in the class of image fragments prior to generating the improved document image, wherein generating the improved document image comprises replacing the image fragments within the document image with corresponding improved image fragments within the plurality of classes after the inverse normalization has been performed.

5. The method of claim 1, wherein processing the class of image fragments to generate the combined and substantially enlarged image of the class comprises averaging the image fragments of the class.

6. The method of claim 1, wherein filtering the combined and substantially enlarged image of the class comprises performing at least one of a rank filtering procedure and a contour filtering procedure on the combined and substantially enlarged image of the class to generate the filtered image for the class.

7. The method of claim 1, wherein each of the plurality of image fragments represents one of a single character or a single character part, and separating the plurality of image fragments into a plurality of classes comprises grouping together all image fragments representing a same character or same character part within a single class of the plurality of classes.

8. The method of claim 1, wherein the plurality of classes comprises a first plurality of classes, and wherein separating the plurality of image fragments comprises separating the plurality of image fragments into the first plurality of classes and a second plurality of classes, wherein each of the second plurality of classes comprises a single image fragment having no other substantially similar image fragment within the plurality of image fragments, wherein the method further comprises, for each of the second plurality of classes, filtering the single image fragment of the class to generate a filtered image fragment for the class.

9. The method of claim 1, wherein the document image comprises a scanned document image received from a third party, and wherein generating the improved document image comprises restoring at least a portion of image quality lost due to at least one of a scanning procedure or a file size reduction procedure prior to receipt of the document image by the computing device.

10. The method of claim 9, wherein the document image has been previously received from a scanning device, wherein the document image was scanned by the scanning device from at least one physical document, and wherein a quality of the previously received document image is lower than a quality of the at least one physical document.

11. The method of claim 10, wherein the quality of the previously received document image is lower than the quality of the at least one physical document due to use of improper scanning device settings during the scanning procedure, and wherein generating the improved document image comprises restoring at least a portion of the image quality lost due to the use of the improper scanning device settings without requiring the document to be rescanned.

12. The method of claim 1, wherein processing the class of image fragments to generate the combined and substantially enlarged image fragment for the class comprises substantially enlarging one or more image fragments such that they are noticeably larger when presented to a user and defects in the one or more image fragments are more noticeable to the user.

13. A system comprising:
at least one computing device operably coupled to at least one memory and configured to:
identify a plurality of image fragments within a document image;
separate the plurality of image fragments into a plurality of classes, wherein each class of the plurality of classes includes a subset of the plurality of image fragments that are substantially similar to one another;
for each of the plurality of classes:
process the class of image fragments to generate a combined and substantially enlarged image of the class, wherein the processing of the class of image fragments comprises:
generating a combined image of the class based on image fragments of the class; and
generating the combined and substantially enlarged image of the class by substantially enlarging the combined image of the class;
filter the combined and substantially enlarged image of the class to generate a filtered image for the class; and
generate an improved document image by replacing or modifying the image fragments within the document image based on the filtered images for the respective classes of the image fragments.

14. The system of claim 13, wherein the processing of the class of image fragments further comprises:
averaging image fragments of the class to generate an averaged image of the class.

15. The system of claim 13, wherein the at least one computing device is configured to process the class of image fragments to generate the combined and substantially enlarged image of the class by:
substantially enlarging image fragments of the class to generate substantially enlarged image fragments; and
averaging the substantially enlarged image fragments to generate the combined and substantially enlarged image of the class.

16. The system of claim 13, wherein the at least one computing device is further configured to, for each of the plurality of classes, normalize the image fragments of the class prior to processing the class of image fragments to generate the combined and substantially enlarged image of the class.

17. The system of claim 16, wherein the at least one computing device is further configured to, for each of the plurality of classes, perform an inverse normalization on each image fragment in the class of image fragments prior to generating the improved document image, wherein the at least one computing device is configured to replace the image fragments within the document image with corresponding improved image fragments within the plurality of classes after the inverse normalization has been performed.

18. The system of claim 13, wherein the at least one computing device is configured to filter the combined and substantially enlarged image of the class by performing at least one of a rank filtering procedure and a contour filtering procedure on the combined and substantially enlarged image of the class to generate the filtered image for the class.

19. The system of claim 13, wherein each of the plurality of image fragments represents one of a single character or a single character part, and wherein the at least one computing device is configured to separate the plurality of image fragments into a plurality of classes by grouping together all image fragments representing a same character or same character part within a single class of the plurality of classes.

20. A computer-readable storage medium having instructions stored thereon that, when executed by a processor, cause the processor to perform operations comprising:
identifying a plurality of image fragments within a document image, wherein each of the plurality of image fragments represents a one of a single character or a single character part;
separating the plurality of image fragments into a plurality of classes, wherein each class of the plurality of classes includes a subset of the plurality of image fragments that are substantially similar to one another, and wherein image fragments representing a same character or same character part are grouped within a single class of the plurality of classes;
for each of the plurality of classes:
normalizing image fragments of the class to generate a normalized set of image fragments of the class;
processing the normalized set of image fragments of the class to generate a combined and substantially enlarged image of the class, wherein the processing of the normalized set of image fragments comprises
generating a combined image of the class based on image fragments of the class; and
generating the combined and substantially enlarged image of the class by substantially enlarging the combined image of the class;
filtering the combined and substantially enlarged image of the class using at least one of a rank filtering procedure and a contour filtering procedure to generate a filtered image for the class;
modifying each image fragment of the normalized set of image fragments of the class based on the filtered image for the class; and
performing an inverse normalization on each image fragment of the normalized set of image fragments to generate a final set of image fragments for the class; and
generating an improved document image by replacing or modifying the image fragments within the document image based on the image fragments in the final set of image fragments for the respective classes of the image fragments.

21. The computer-readable storage medium of claim 20, wherein the processing of the normalized set of image fragments comprises:
averaging the normalized set of image fragments to generate an averaged image of the class.

22. The computer-readable storage medium of claim 20, wherein processing the normalized set of image fragments to generate the combined and substantially enlarged image of the class comprises:
substantially enlarging the normalized set of image fragments to generate two or more substantially enlarged image fragments; and
averaging the two or more substantially enlarged image fragments to generate the combined and substantially enlarged image of the class.

* * * * *